(12) United States Patent
Saeedi et al.

(10) Patent No.: US 10,511,858 B2
(45) Date of Patent: Dec. 17, 2019

(54) BIT PACKING FOR DELTA COLOR COMPRESSION

(71) Applicant: ATI TECHNOLOGIES ULC, Markham (CA)

(72) Inventors: Mehdi Saeedi, Markham (CA); Khaled Mammou, Vancouver (CA); Arash Hariri, Markham (CA); Gabor Sines, Markham (CA); Lei Zhang, Markham (CA)

(73) Assignee: ATI Technologies ULC, Markham (CA)

( * ) Notice: Subject to any disclaimer, the term of this patent is extended or adjusted under 35 U.S.C. 154(b) by 294 days.

(21) Appl. No.: 15/209,194

(22) Filed: Jul. 13, 2016

(65) Prior Publication Data
US 2018/0020232 A1 Jan. 18, 2018

(51) Int. Cl.
*H04N 19/59* (2014.01)
*H04N 19/184* (2014.01)
(Continued)

(52) U.S. Cl.
CPC .......... *H04N 19/59* (2014.11); *H04N 19/176* (2014.11); *H04N 19/182* (2014.11);
(Continued)

(58) Field of Classification Search
CPC ...... H04N 19/59; H04N 19/91; H04N 19/593; H04N 19/184; H04N 19/182; H04N 19/186
See application file for complete search history.

(56) References Cited

U.S. PATENT DOCUMENTS

| | | | |
|---|---|---|---|
| 5,845,021 A | | 12/1998 | Kikuchi et al. |
| 5,850,483 A | * | 12/1998 | Takabatake ............ G09G 5/393 |
| | | | 382/233 |

(Continued)

FOREIGN PATENT DOCUMENTS

| | | |
|---|---|---|
| CA | 2808376 A1 | 6/2012 |
| JP | 2014027658 A | 2/2014 |

OTHER PUBLICATIONS

J. Kim, M. Sullivan, E. Choukse and M. Erez, "Bit-Plane Compression: Transforming Data for Better Compression in Many-Core Architectures," 2016 ACM/IEEE 43rd Annual International Symposium on Computer Architecture (ISCA), Seoul, 2016, pp. 329-340. (Year: 2016).*

(Continued)

*Primary Examiner* — Gims S Philippe
*Assistant Examiner* — Stefan Gadomski (57) ABSTRACT

A compressor is configured to determine delta color compression values for a plurality of pixels in a block and subdivide the plurality of pixels in the block into a plurality of groups and transmit a compressed bitstream representative of the delta values. The compressed bitstream includes bits representative of a block header that indicates a range of numbers of bits that are sufficient to represent the delta values, a plurality of group headers that each indicate a group minimum number of bits that is sufficient to represent the delta values in a corresponding one of the plurality of groups, and the delta values encoded using the group minimum number of bits for the group that includes the delta values. A decompressor configured to decompress the compressed bitstream based on the block header, the plurality of group headers, and the encoded delta values.

26 Claims, 8 Drawing Sheets

(51) Int. Cl.
*H04N 19/182* (2014.01)
*H04N 19/186* (2014.01)
*H04N 19/176* (2014.01)
*H04N 19/593* (2014.01)
*H04N 19/91* (2014.01)

(52) U.S. Cl.
CPC ......... *H04N 19/184* (2014.11); *H04N 19/186* (2014.11); *H04N 19/593* (2014.11); *H04N 19/91* (2014.11)

(56) References Cited

U.S. PATENT DOCUMENTS

| | | | | |
|---|---|---|---|---|
| 6,205,250 | B1* | 3/2001 | Kranawetter | H04N 19/61 348/420.1 |
| 7,920,749 | B1* | 4/2011 | Donovan | H04N 19/105 382/233 |
| 8,582,897 | B2 | 11/2013 | Kuboyama | |
| 9,729,169 | B2 | 8/2017 | Kalevo et al. | |
| 2005/0058341 | A1* | 3/2005 | Maruoka | G06K 9/325 382/167 |
| 2009/0003714 | A1* | 1/2009 | Subramaniam | H04N 19/176 382/232 |
| 2009/0296822 | A1* | 12/2009 | Sandeep | H04N 19/61 375/240.24 |
| 2011/0025701 | A1* | 2/2011 | Jain | G06T 11/60 345/589 |
| 2014/0029864 | A1* | 1/2014 | Reif | H04N 19/593 382/238 |
| 2014/0286584 | A1* | 9/2014 | Alfonso | H04N 19/176 382/233 |
| 2015/0062139 | A1* | 3/2015 | Akenine-Moller | G06T 1/60 345/555 |
| 2015/0149866 | A1 | 5/2015 | Goodman et al. | |
| 2016/0119646 | A1* | 4/2016 | Eslami | H04N 19/176 382/248 |
| 2017/0006304 | A1* | 1/2017 | Miyoshi | H04N 19/52 |
| 2017/0178594 | A1* | 6/2017 | Hasselgren | H04N 19/124 |

OTHER PUBLICATIONS

International Search Report and Written Opinion dated Nov. 8, 2017 for PCT Application No. PCT/IB2017/054213, 11 pages.
Li Guo, et al., "A New Reference Frame Recompression Algorithm and Its VLSI Architecture for UHDTV Video Codec", IEEE Transactions on Multimedia, vol. 16, No. 8, Dec. 2014, pp. 2323-2332.
Xin Li, et al., "Edge-Directed Prediction for Lossless Compression of Natural Images," IEEE Transations on Image Processing, vol. 10, No. 6, Jun. 2001, pp. 813-817.
Xiaolin Wu, et al., "Context-Based, Adaptive, Lossless Image Coding," IEEE Transactions on Communications, vol. 15, No. 4, Apr. 1997, pp. 437-444.
Marcelo J. Weinberger, et al., "The Loco-I Lossless Image Compression Algorithm: Principles and Standardization into JPEG-LS," IEEE Transactions on Image Processing, vol. 9, No. 8, Aug. 2000, pp. 1309-1324.
International Preliminary Report on Patentability dated Jan. 24, 2019 for corresponding International Application No. PCT/US2017/054213, 7 pages.

* cited by examiner

BIT PACKING FOR DELTA COLOR COMPRESSION

BACKGROUND

Description of the Related Art

Memory bandwidth management is a challenge in processing systems such as systems-on-a-chip (SOCs) that generate high-bandwidth flows on buses that interconnect instruction processors on the SOC and over interfaces between the SOC and external memory such as dynamic random access memory (DRAM). For example, graphics processing is used to render a three-dimensional (3-D) model of a scene as pixels displayed on a screen. For purposes of the following, a complete image is referred to as a frame and the number of pixels in a frame is determined by the pixel resolution of the screen. The color of each pixel in a frame is represented by a particular number of bits that represent a corresponding number of different colors over a particular color range or gamut. To illustrate, an eight-bit value can be used to represent which of 256 colors a particular pixel represents. The number of bits used to represent a pixel is typically referred to as the color depth or the bit depth of the pixel. The total number of bits used to represent each frame increases in proportion to the number of bits used to represent each pixel and the number of pixels in the display. Movement in the scene is represented by displaying successive frames at a particular frame rate, such as 30 frames per second (fps). Thus, the rate at which bits are generated by a graphics processing unit (GPU) for transmission over buses or interfaces increases in proportion to the frame rate. Successive generations of GPUs have attempted to improve the quality of the rendered images by different methods such as supporting higher pixel resolutions, greater color depths or color gamuts, and higher frame rates. Thus, the volume of traffic communicated between different elements in a system such as the GPU, the display, and the external memory is large and continually increasing.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As described herein, the bandwidth consumed by video/graphics images (or other bit streams) can be reduced by implementing delta color compression to represent colors of pixels in a block based on a color of a reference pixel and delta values that represent differences between the colors of the other pixels and the color of the reference pixel. A compressor subdivides the pixels in each block into groups. The compressor determines a minimum number of bits, $B\_i$, that are needed to represent the delta values of the pixels in group i and the compressor determines a minimum number of bits (M) that represents the smallest value of the number of bits that represents the delta values in the groups of the block. The compressor also determines a number of bits (B) that are required to indicate the difference between the minimum number of bits and a maximum number of bits that represents the largest value of the number of bits needed to represent the delta values in the groups of the block. The values of M and B are included in a block header that is transmitted from the compressor to a decompressor in association with the resulting compressed pixel data. The values of M and B can be encoded separately for inclusion in the block header or a combination of the values of M and B can be encoded using an encoding that represents all possible combinations for M and B. The compressor also generates group headers that include values of the difference between $B\_i$ and $\underline{M}$ ($B\_i-M$) that, in combination with M, indicate the number of bits that represent the delta values in the corresponding group. The compressor can compress the delta values for pixels in each group using the number of bits indicated by the corresponding group header and the decompressor can use the information in the block header and the group headers to decompress the compressed information. Some embodiments of the compressor apply the compression algorithm to different group configurations and select the best group configuration that produces the highest level of compression. The compressor includes information in the block header that indicates the selected group configuration.

Delta values inside each group can be zero, positive, or negative numbers. As such, one sign bit is required for each delta value in a group. Some embodiments of the compressor further reduce the number of bits used to represent the pixels in the blocks based on characteristics of the delta values in the groups. For example, the bit representative of the sign of each delta value can be dropped if all the delta values in a group are either positive (including zero) or negative (including zero). The compressor can include bits in the group headers to indicate whether the group is all positive, all negative, or mixed so that the decompressor will know how to decompress the delta values. Some embodiments of the compressor use one bit for one configuration (e.g., all-positive) and two bits for the other two configurations (e.g., all-negative and mixed) as long as the selected 1-bit code and 2-bit code start with different bit values so that the decompressor can distinguish between the codes. Another possibility is to combine sign bits of all groups together and assign one code to all sign bits instead of using different one-bit and two-bit codes for different groups. A net gain in compression is produced if the number of bits saved by eliminating one bit for each delta value is more than the number of bits added to represent signs of the groups. The number of bits used to represent the delta values in a group can also be reduced if a maximum absolute delta value for a pixel in the group is equal to a power-of-two, as discussed herein. In some variations, a bypass bit is included in each block header to enable or disable these features. The bypass bit can be dropped if all the delta values in a block are zero, the pixels in the block have the same color value.

Figure 1:
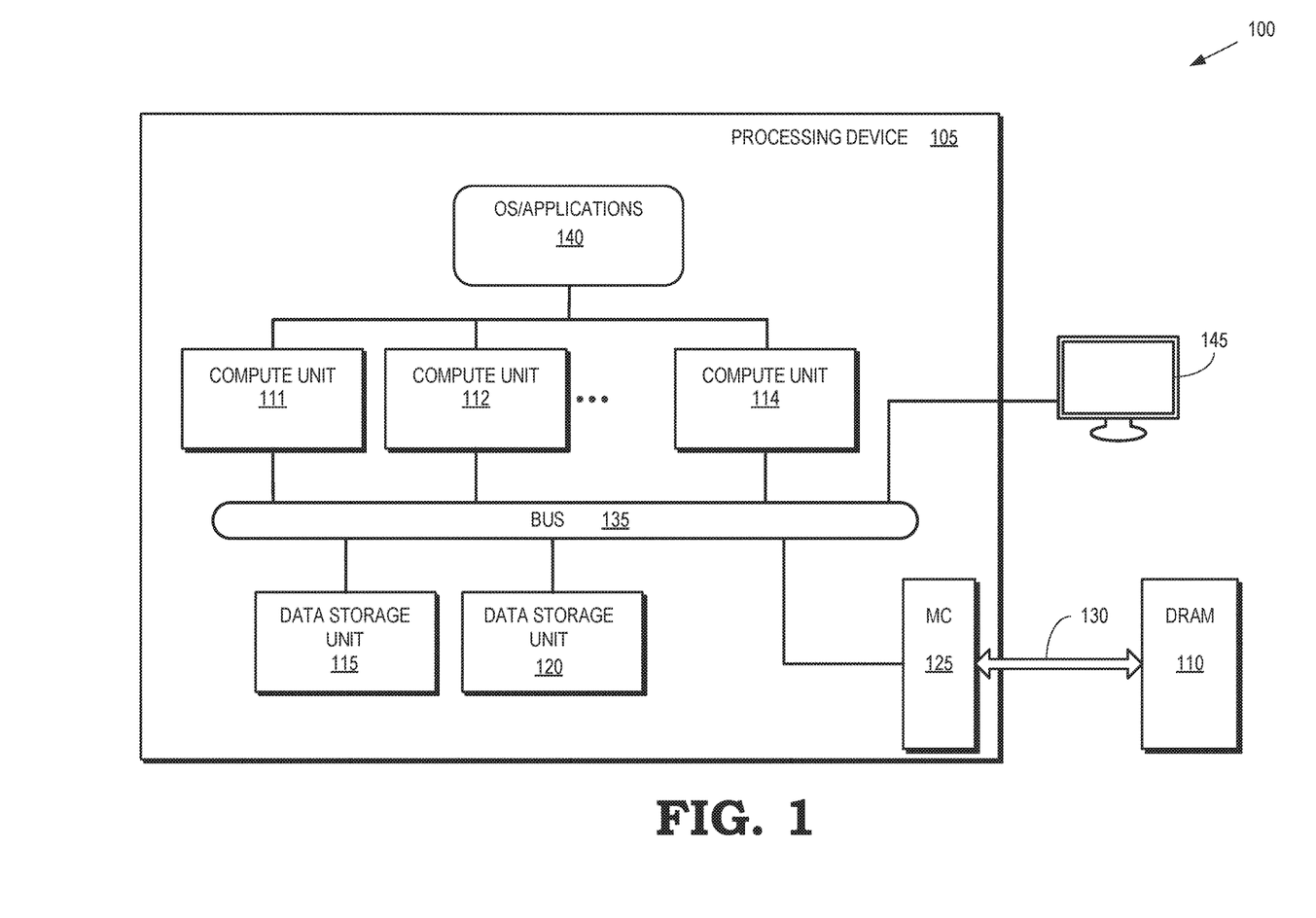
FIG. 1 is a block diagram of a processing system according to some embodiments.

FIG. 1 is a block diagram of a processing system 100 according to some embodiments. The processing system 100 includes a processing device 105 that is connected to one or more external memories such as a dynamic random access memory (DRAM) 110. The processing device 105 includes a plurality of compute units 111, 112, 113, 114 (collectively referred to as the "compute units 111-114") such as CPUs or GPUs. For example, the processing device 105 may be a system-on-a-chip (SOC) such as an accelerated processing unit (APU) or accelerated processing device (APD) that is formed on a substrate. Each of the compute units 111-114 includes a plurality of processor cores that can concurrently process different instructions. The compute units 111-114 also include one or more resources that are shared by the processor cores, such as caches, arithmetic logic units, floating-point units, branch prediction logic, memory or bus interfaces, and the like.

The processing device 105 includes data storage units 115, 120 for storing instructions or data that may be used by the compute units 111-114 or other entities in the processing device 105. Some embodiments of the data storage units 115, 120 are implemented with DRAM. A memory controller (MC) 125 is used to coordinate the flow of data between the processing device 105 and the DRAM 110 over a memory interface 130. The memory controller 125 includes logic used to control reading information from the DRAM 110 and writing information to the DRAM 110. The compute units 111-114 are able to communicate with each other, with the data storage units 115, 120, with the memory controller 125, or with other entities in the processing system 100 using a bus 135. For example, the compute units 111-114 typically include a physical layer interface or bus interface for asserting signals onto the bus 135 and receiving signals from the bus 135 that are addressed to the corresponding compute unit 111-114. Some embodiments of the processing device 105 also include one or more bridges such as a northbridge or a southbridge for facilitating communication between entities in the processing device 105.

The processing device 105 implements an operating system (OS) or one or more applications 140 that generate workloads in the processing device 105. Although a single instance of the OS/applications 140 is shown in FIG. 1, some embodiments of the processing device 105 implement multiple instantiations of the operating system or one or more of the applications. For example, virtual machines executing on the compute units 111-114 are able to execute separate instances of the operating system or one or more of the applications.

Some embodiments of the processing device 105 perform graphics processing to render scenes represented by a 3-D model to generate images for display on a screen 145. For example, one or more of the compute units 111-114 can access information representative of the 3-D model stored on the DRAM 110 via the bus 135 and the interface 130. The compute units 111-114 then use the accessed information to render a portion of the scene to generate an image for display on the screen 145. The compute units 111-114 transmit information representative of the rendered images to the screen 145 via the bus 135. Information is conveyed between the entities in the processing system 100 as streams of bits. As discussed herein, the volume of traffic generated by the compute units 111-114, the DRAM 110, the data storage unit 115, the data storage unit 120, the screen 145, or other entities in the processing system 100 can severely tax the bandwidth available in the memory interface 130, the bus 135, or other interconnections in the processing system 100, particularly for graphics applications that generate bitstreams representative of video or graphic information.

Delta color compression and bit packing are used to compress bitstreams that are representative of video or graphic information, such as the colors of pixels that represent images for display on the screen 145. Some embodiments of the compute units 111-114 (or other entities in the processing system 100 that generate streams of bits) implement compressors (not shown in FIG. 1) to perform the delta color compression and bit packing. The compressors are implemented as hardware, firmware, software, or a combination thereof that can be executed on the corresponding compute units 111-114. The compressors can be implemented as stand-alone entities that receive information from the compute units 111-114 or other entities. Some embodiments of the compressors compute delta values for pixels in blocks that make up a frame. For example, each block can include an 8×8 set of pixels, e.g., 64 pixels, that represent a square portion of the image. Each delta value represents a difference between a color of a corresponding pixel and a reference color of a reference pixel selected from the plurality of pixels. The compressor can subdivide the pixels in the block into a groups such as eight 8×1 groups of pixels or eight 4×2 groups of pixels. The compressor can then generate a compressed bitstream that represents the delta values using a smaller number of bits than the uncompressed bitstream. For example, as discussed herein, the compressor can generate a compressed bitstream that includes a block header associated with the block of pixels, group headers associated with the subdivided groups of pixels, and encoded delta values. The delta values for each group are encoded using different numbers of bits, as indicated by information included in the block header and the corresponding group header. Decompressors (not shown in FIG. 1) can decompress the compressed bitstream to recover the bits in the uncompressed bitstream, as discussed herein.

Figure 2:
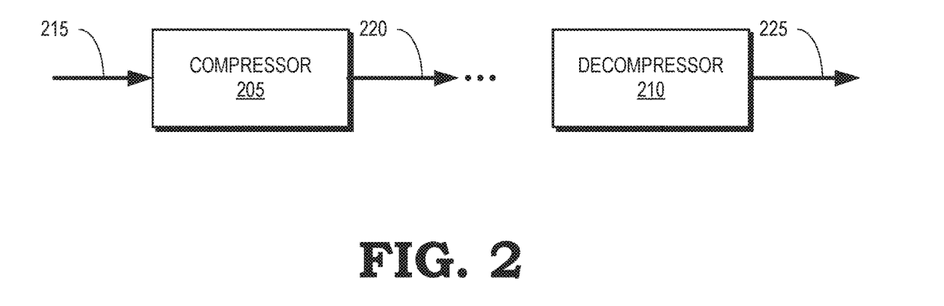
FIG. 2 is a block diagram of a portion of a processing system according to some embodiments.

FIG. 2 is a block diagram of a portion 200 of a processing system according to some embodiments. The portion 200 includes a compressor 205 and a decompressor 210 that are implemented in hardware, firmware, software, or a combination thereof. Some embodiments of the compressor 205 and the decompressor 210 are implemented at different locations in the processing system 100 shown in FIG. 1. For example, the compressor 205 can be implemented as part of one of the compute units 111-114 (or configured to receive bits from the compute units 111-114) and the decompressor 210 can be implemented as part of the DRAM 110 or the screen 145 (or configured to provide bits to the DRAM 110 or the screen 145). The compressor 205 receives an uncompressed bitstream 215, which represents colors of pixels in frame in some cases. The compressor 205 compresses the uncompressed bitstream 215 according to some embodiments of the delta color compression and bit packing techniques described herein to generate a compressed bitstream 220 that is provided to the decompressor 210. The decompressor 210 decompresses the compressed bitstream 220 to recover an uncompressed bitstream 225, which includes the same bits as the uncompressed bitstream 215 or different bits depending upon whether the compression is lossless or lossy and whether errors occurred in transmission of the compressed bitstream 220.

Figure 3:
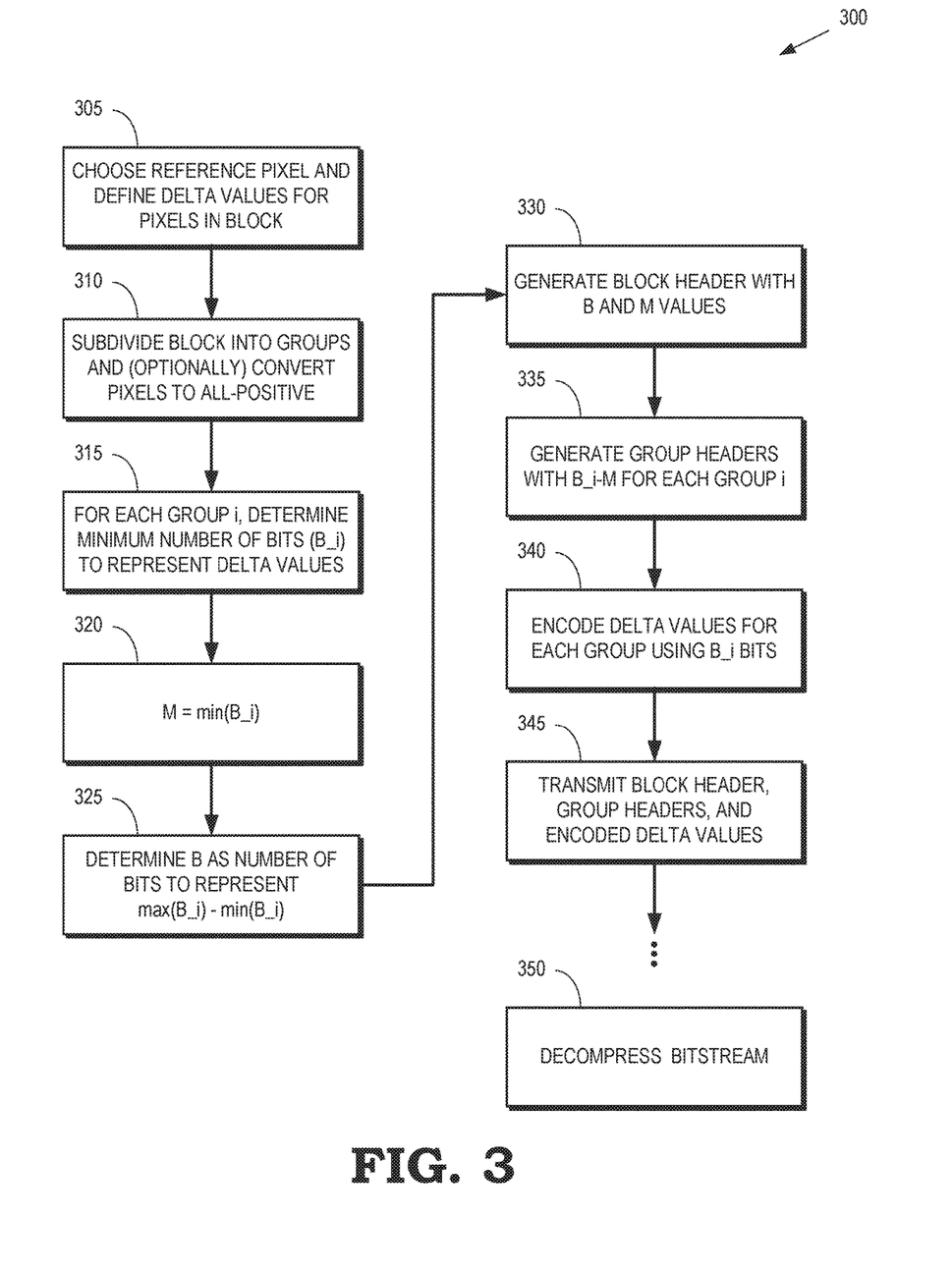
FIG. 3 is a flow diagram of a method for performing delta color compression and bit packing according to some embodiments.

FIG. 3 is a flow diagram of a method 300 for performing delta color compression and bit packing according to some embodiments. The method 300 is implemented in some embodiments of the compressor 205 shown in FIG. 2. The method 300 is applied to a block of pixels such as an 8×8 block, which preserves memory addressability by using a block size of 64 bytes. Memory addressability can also be preserved in other cases by choosing other sizes of blocks of pixels so that they are aligned to a particular number of bytes such as 64 bytes. Some embodiments of the method 300 can be performed iteratively or multiple instances of the method 300 can be performed concurrently or in parallel (e.g., on multiple processor cores implemented in the compute units 111-114 shown in FIG. 1) to perform delta color compression and bit packing on multiple blocks such as the blocks of pixels that represent an image for display on a screen. Decompression of bitstreams that are compressed according to the method 300 is performed by some embodiments of the decompressor 210 shown in FIG. 2, as discussed herein.

At block 305, the compressor chooses a reference pixel from among the pixels in the block and determines a color value for the reference pixel. For example, the color value for the reference pixel can be represented by values of eight bits if an 8-bit color depth (or color gamut) is used to represent the colors of the pixels. In some variations, the compressor chooses more than one pixel as a potential reference pixel and then selects one pixel from the potential reference pixels to use as a reference. Information identifying the potential reference pixels is included in a corresponding block header. The compressor then defines delta values that represent a difference between the color value of the reference pixel and color values of the other pixels in the block. The delta values for the pixels can be positive or negative depending on the relative values of the color of the reference pixel and the color of the pixel. The number of pixels that is sufficient to represent the delta values depends on the range of possible delta values of the pixels in the block. For example, if the pixels are represented by an 8-bit color depth, the delta values of the pixels are in the range −255 to +255. Eight bits are sufficient to represent the absolute value of the delta values, which ranges from 0 to 255, and one additional bit is needed to represent the sign of the delta values. In some embodiments, the sign of the delta values is represented by converting negative numbers to even numbers and positive numbers to odd numbers. For example, a series of delta values {0 1, −1, 2, −2, 3, −3} can be converted to a series {0, 1, 2, 3, 4, 5, 6} that encodes the positive and negative delta values as even and odd positive values, respectively. For another example, the values 0 to $2^{n-1}-1$ can be used to represent the positive delta values and the values $2^{n-1}$ to $2^n-1$ can be used to represent the negative delta values. Other encodings of the positive and negative delta values into all-positive numbers can also be used.

At block 310, the compressor subdivides the block into groups of pixels. For example, in some variations the compressor subdivides the block into eight groups of pixels arranged in 8×1 configurations or eight groups of pixels arranged in 4×2 configurations. In some variations, the values of the pixels in the pixel groups are converted into all-positive numbers, as discussed herein.

At block 315, the compressor determines a group minimum number of bits (B_i) that is sufficient to represent the delta values within each group (i). If the positive and negative delta values have been converted to a series of positive numbers, the group minimum number of bits are determined using:

$$B\_i = \text{floor}(\log_2 M\_i) + 1$$

where M_i is the maximum delta value for a pixel within the group. For example, the delta values in a first group (i=1) can have delta values that range from 0 to 6 so that the delta values for the first group can be represented by three bits (B_i=3), the delta values in a second group (i=2) can have delta values that range from 0 to 13 so that the delta values for the second group can be represented by four bits (B_i=4), and the delta values in a third group (i=3) can have delta values that range from 0 to 22 so that the delta values for the third group can be represented by five bits (B_i=5). In this example, the delta values for the remaining groups are also represented by 3-5 bits.

At block 320, the compressor determines a number of bits (M) that is equal to a smallest number of bits that is sufficient to represent the delta values in any one of the groups of the block. The minimum number of bits (M) is determined by taking the minimum of the group minimum numbers of bits that are sufficient to represent each of the groups in the block according to:

$$M = \min_i B\_i$$

Thus, if the delta values for the groups can be represented by 3-5 bits, as in the above example, then the minimum number of bits M=3 for the block.

At block 325, the compressor determines a number of bits (B) that is sufficient to represent a difference between M and the largest number of bits that is sufficient to represent the delta values in the block. The largest number of bits is determined by taking the maximum of the group minimum numbers of bits that are sufficient to represent each of the groups in the block. The number of bits (B) can therefore be determined according to:

$$B = \max_i B\_i - \min_i B\_i$$

Thus, the number of bits B=2 for the groups in the block if the delta values for the groups can be represented by 3-5 bits, as in the above example.

At block 330, the compressor generates a block header that includes bits representative of M and B. Some embodiments of the block header include a first number of bits to represent M and a second number of bits to represent B. For example, four bits in the block header can be used to represent M and four bits in the block header can be used to represent B if the pixels are represented by an 8-bit color depth, in which case as many as nine bits could be required to represent the delta values in the groups. Some embodiments of the block header alternatively include a number of bits to represent all possible combinations of the values of M and B, which reduces the total number of bits included in the block header. For example, the following table illustrates separate encoding of the values of M and B and a combined encoding of the same values of M and B.

| Max(B_i) | M = Min(B_i) | B = Max(B_i) - Min(B_i) | Separate Encoding | Combined Encoding |
|---|---|---|---|---|
| 0 | 0 | 0 | 0000 0000 | 000000 |
| 1 | 0 | 1 | 0000 0001 | 000001 |
|   | 1 | 0 | 0001 0000 | 000010 |
| 2 | 0 | 2 | 0000 0010 | 000011 |
|   | 1 | 1 | 0001 0001 | 000100 |
|   | 2 | 0 | 0010 0000 | 000101 |
| 3 | 0 | 3 | 0000 0011 | 000110 |
|   | 1 | 2 | 0001 0010 | 000111 |
|   | 2 | 1 | 0010 0001 | 001000 |
|   | 3 | 0 | 0011 0000 | 001001 |
| ... | | | | |
| 8 | 6 | 2 | 0110 0010 | 101010 |
|   | 7 | 1 | 0111 0001 | 101011 |
|   | 8 | 0 | 1000 0000 | 101100 |

At block 335, the compressor generates a group header for each group i. Some embodiments of the group header include one or more bits to represent a value of $B_i-M$ for the corresponding group. Fewer bits are sufficient to represent the quantity $B_i-M$, relative to the number of bits that would be sufficient to represent the quantity except in the case M=0, in which case the same number of bits is used to represent the quantity $B_i-M$, and the quantity $B_i$. Consequently, using the quantity $B_i-M$ to represent the number of bits that are sufficient to represent the delta values in each group reduces the overall number of bits that need to be transmitted from the compressor to the decompressor. For example, if the block uses an 8-bit color depth for the pixels, the quantities M and B are each represented by four bits if M and B are encoded separately. The quantity $B_i-M$ can be represented using B bits so that 8*B bits are sufficient to represent quantity $B_i-M$ for all eight groups.

At block 340, the compressor encodes delta values for each group i using $B_i$ bits to represent the delta values. Returning to the example of block 315, the delta values in the first group (i=1) are encoded using three bits (B_i=3), the delta values in the second group (i=2) are encoded using four bits (B_i=4), and the delta values in the third group (i=3) are encoded using five bits (B_i=5).

At block 345, the compressor transmits the block header, the group headers, and the encoded delta values towards the decompressor. For example, compressors associated with the compute units 111-114 transmit the block header, the group headers, and the encoded delta values via the bus 135 towards the memory controller 125 or the screen 145 shown in FIG. 1.

At block 350, the decompressor receives a bitstream that includes bits that represent the block header, the group headers, and the encoded delta values. The decompressor can decompress the bitstream to recover the uncompressed bits that represent the delta values using the information in the block header and the group headers. For example, the decompressor reads the value of B from the block header and uses this value to determine the number of bits that represent the quantity $B_i-M$ for all the groups, i.e. the 8*B bits if the block has been subdivided into eight groups. The decompressor also reads the value of M from the block header. For each group, the decompressor reads the value of the quantity $B_i-M$ from the corresponding group header and combines the value $B_i-M$ with the value of M to determine the value of the quantity $B_i$ for the corresponding group. The decompressor uses the value of the quantity B, to parse the bits that represent the encoded delta values so that the encoded delta values can be decoded correctly. For example, if the quantity $B_i=3$ for a group, the decompressor determines that each encoded delta value is represented by three bits in the bitstream.

Figure 4:
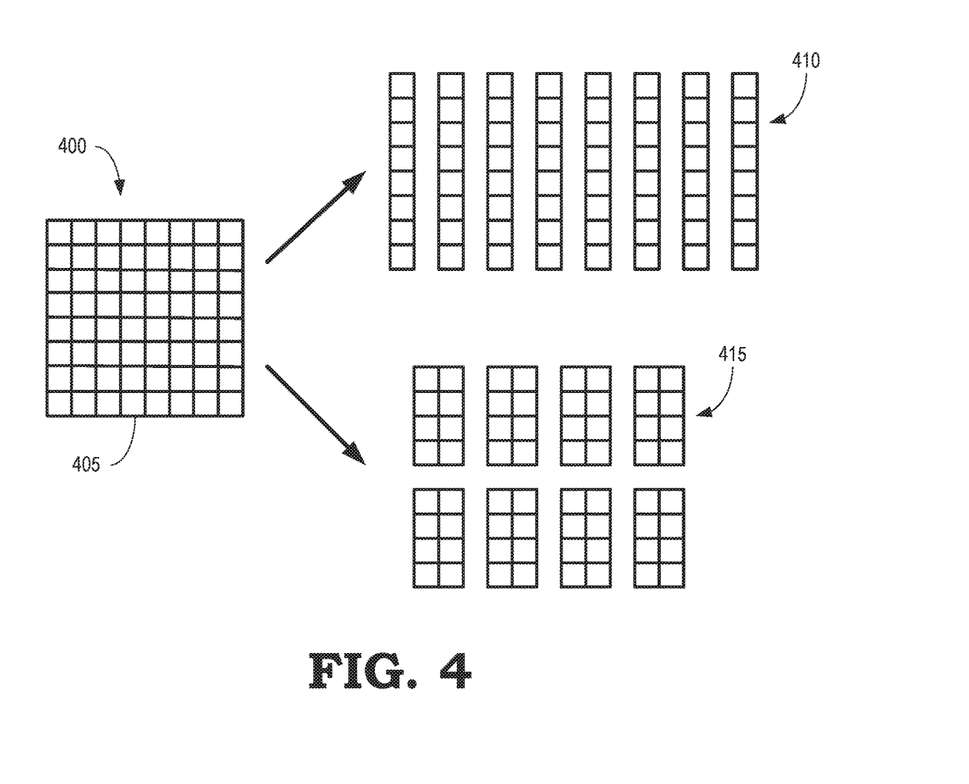
FIG. 4 is a block diagram of a block of pixels that may be subdivided into groups of pixels in different group configurations according to some embodiments.

FIG. 4 is a block diagram of a block 400 of pixels that can be subdivided into groups of pixels in different group configurations according to some embodiments. The block 400 includes 64 pixels 405 (only one indicated by a reference numeral in the interest of clarity) that are arranged in an 8×8 grid. However, other embodiments of the block 400 include different numbers of pixels arranged in different patterns. The block 400 is subdivided into groups of pixels, e.g., by a compressor such as the compressor 205 shown in FIG. 2. In a first group configuration, the block 400 is subdivided into eight groups 410 (only one indicated by a reference numeral in the interest of clarity) that are each arranged in an 8×1 grid configuration. In a second group configuration, the block 400 is subdivided into eight groups 415 (only one indicated by a reference numeral in the interest of clarity) that are each arranged in a 4×2 grid configuration. Other group configurations can also be used to subdivide the block 400 into more or fewer groups.

Some embodiments of the compressor determine a number of bits required to encode delta values for the pixels 405 when the block 400 is subdivided into different groups according to two or more different group configurations. For example, in the illustrated case of two different group configurations, the block 400 can be subdivided into the groups 410 according to the first group configuration and the groups 415 according to the second configuration. The compressor then executes portions of the method 300 shown in FIG. 3 to estimate the number of bits required to encode the delta values for the pixels 405 according to the different group configurations. The compressor then compares the different values of the number of bits and selects the group configuration that results in the smallest number of bits in the compressed bitstream. The selected group configuration is then be used to compress the bitstream, e.g., according to some embodiments of the method 300 shown in FIG. 3.

Figure 5:
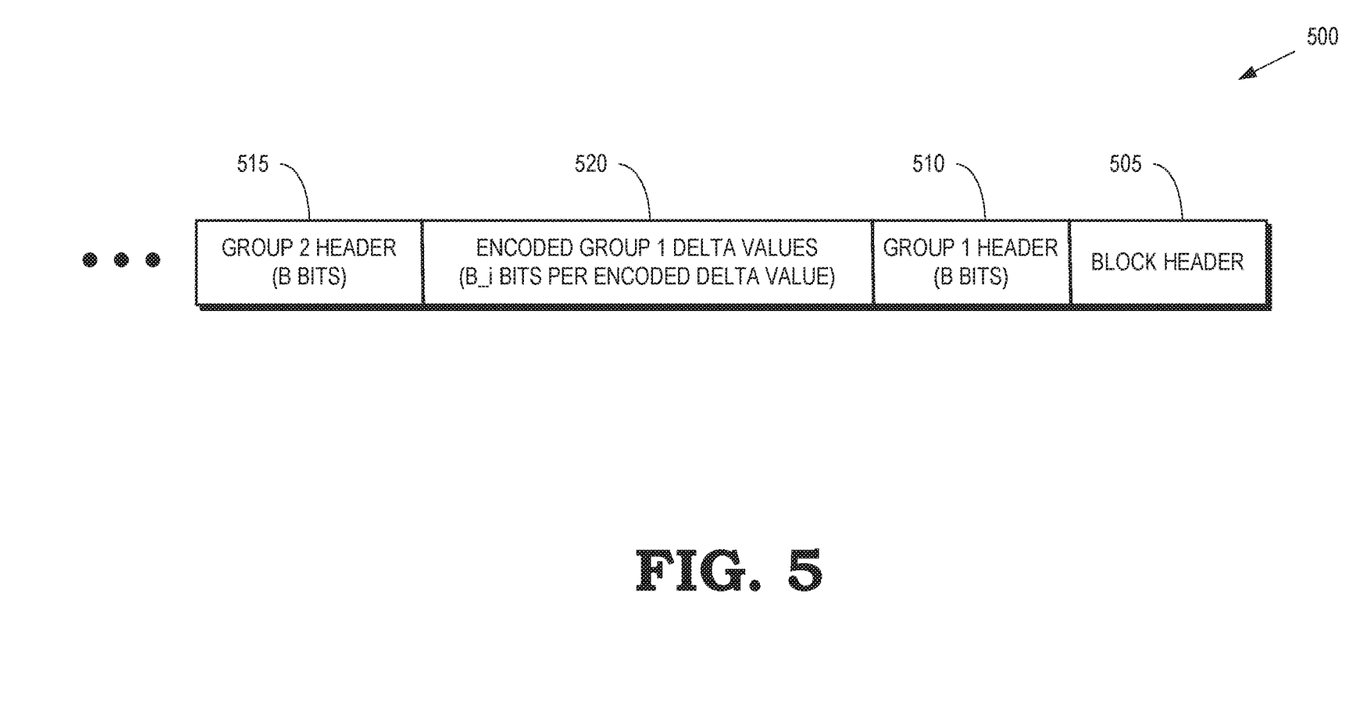
FIG. 5 is a block diagram of a compressed bitstream that represents delta values of pixels in a block according to some embodiments.

FIG. 5 is a block diagram of a compressed bitstream 500 that represents delta values of pixels in a block according to some embodiments. The bitstream 500 is generated by some embodiments of the compressor 205 to form the compressed bitstream 220 shown in FIG. 2, e.g., by performing some embodiments of the method 300 shown in FIG. 3. The bitstream 500 shown in FIG. 5 is generated based on delta values of pixels that are determined based on color values of the pixels that have an 8-bit color depth. However, color depths having larger or smaller numbers of bits can also be used.

The bitstream 500 includes a block header 505 formed of bits that represent a minimum number of bits (M) that is sufficient to represent the delta values for any group in the block. The block header 505 also includes bits that represent a number of bits (B) that is sufficient to represent a difference between M and the largest number of bits that is sufficient to represent the delta values in the block. The values M and B are each represented by four bits so that the block header 505 includes at least eight bits for 8-bit pixel depths. However, as discussed herein, a small number of bits can be included in the block header 505 to represent all possible combinations of values M and B instead of representing these values separately. Furthermore, as discussed below, some embodiments of the compression algorithm implement features that change the number of bits in the block header 505.

The bitstream 500 also includes group headers 510, 515 associated with each of the groups of delta values for the block. For example, the group header 510 includes bits that represent a value of $B_1$–M for the group 1 and the group header 515 includes bits that represent a value of $B_2$–M for the group 2. As discussed herein, B bits are sufficient to represent values of $B_i$–M for the groups, so the group headers 510, 515 include B bits. However, as discussed below, some embodiments of the compression algorithm implement features that change the number of bits in the group headers 510, 515.

The bitstream 500 further includes the encoded delta values for the groups corresponding to the group headers 510, 515. For example, the bitstream 500 includes encoded delta values 520 for the group 1 that is associated with the group header 510. The encoded delta values 520 may be represented by $B_i$ bits per encoded delta value. For example, if the eight encoded delta values 520 for the group 1 are each represented by $B_i$=3 bits then the encoded delta values 520 are represented by 24 bits. However, as discussed below, some embodiments of the compression algorithm implement features that change the number of bits that are sufficient to represent the encoded delta values 520.

Figure 6:
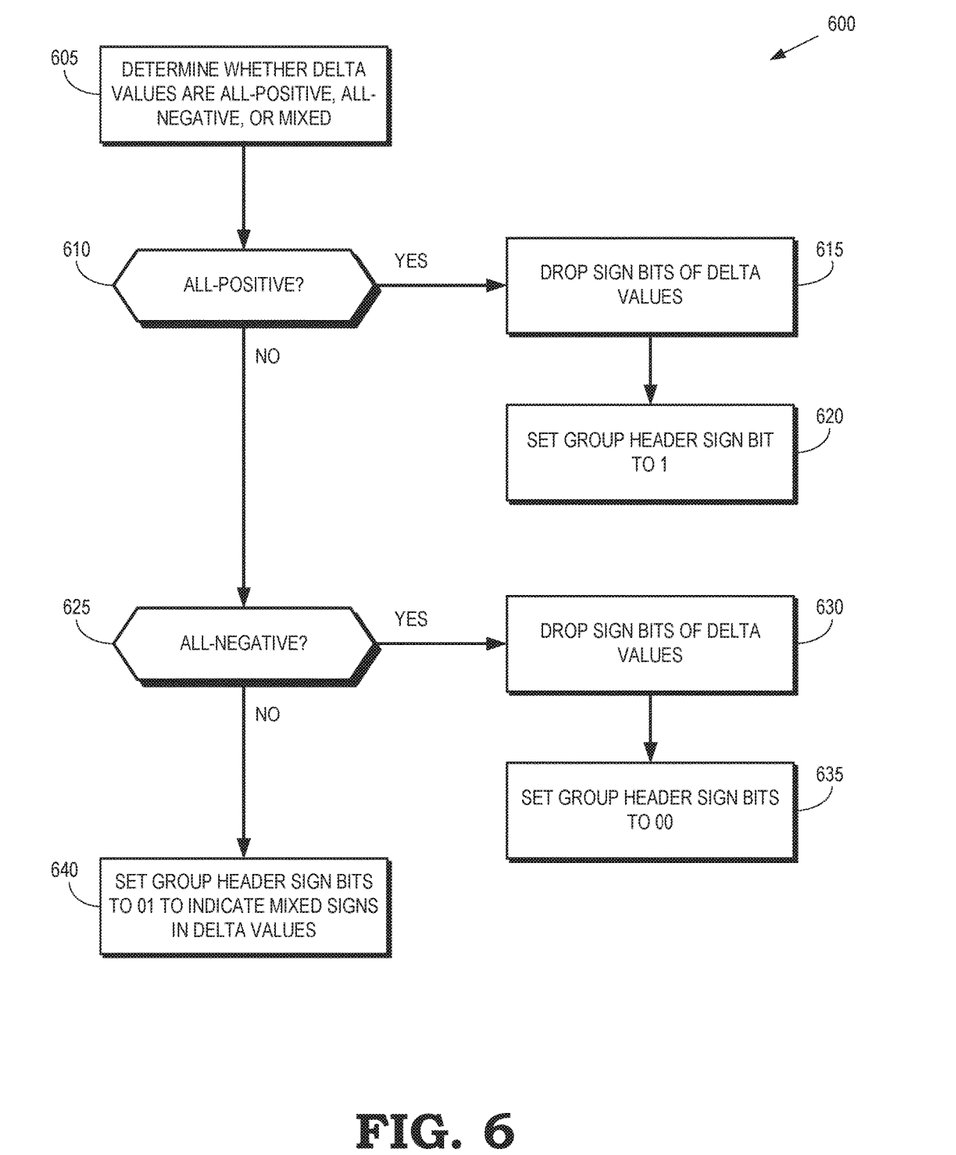
FIG. 6 is a flow diagram of a method for reducing a number of bits used to represent all-positive delta values or all-negative delta values according to some embodiments.

FIG. 6 is a flow diagram of a method 600 for reducing a number of bits used to represent all-positive delta values or all-negative delta values according to some embodiments. In different variations of the method 600, the number 0 is considered positive or negative for the purposes of determining whether the delta values are all-positive or all-negative. The method 600 is implemented by some embodiments of the compressor 205 shown in FIG. 2. A corresponding decompression process is implemented in some embodiments of the decompressor 210 shown in FIG. 2 to decode the compressed bitstream that is generated according to the method 600.

At block 605, the compressor determines whether delta values in a group have all positive values, all negative values, or a mixture of positive values and negative values. The compressor can then add bits to the corresponding group header to indicate all-positive, all-negative, or mixed positive and negative values. Two bits are sufficient to represent the three possible states of the delta values in the group.

At decision block 610, the compressor determines whether the delta values in the group have all-positive values. If so, the compressor drops the sign bits from the delta values in the group at block 615. At block 620, the compressor sets a first sign bit in the corresponding group header to 1 to indicate that the delta values in the group have all-positive values. In the illustrated embodiment, the value of a second sign bit in the corresponding group header is set to either 0 or 1, or the second sign bit can be left out of the corresponding group header to further reduce the bit count. If the delta values in the group do not have all-positive values, the method flows to decision block 625.

At decision block 625, the compressor determines whether the delta values in the group have all negative values. If so, the compressor drops the sign bits from the delta values in the group at block 630. At block 635, the compressor sets the first and second sign bits in the corresponding group header to 0 to indicate that the delta values in the group have all negative values. If the delta values in the group do not have all negative values, the method flows to decision block 640.

At block 640, the compressor sets the first sign bit in the corresponding group header to 0 and the second sign bit in the corresponding group header to 1 to indicate that the delta values in the group have a mixture of positive and negative values.

The method 600 illustrated in FIG. 6 uses one or two sign bits in each group header to indicate whether the delta values in the corresponding group are all-positive, all-negative, or mixed. However, in some embodiments, the compressor uses a smaller number of bits to represent all possible combinations of the states of the groups in a block. For example, the three possible states of the delta values in eight groups correspond to $3^8$=6561 different combinations, which can be represented by 13 bits because $2^{13}$=8192, whereas $2^{12}$=4096. The bits that represent the combinations of the states of the groups and the block may be included in the block header.

Figure 7:
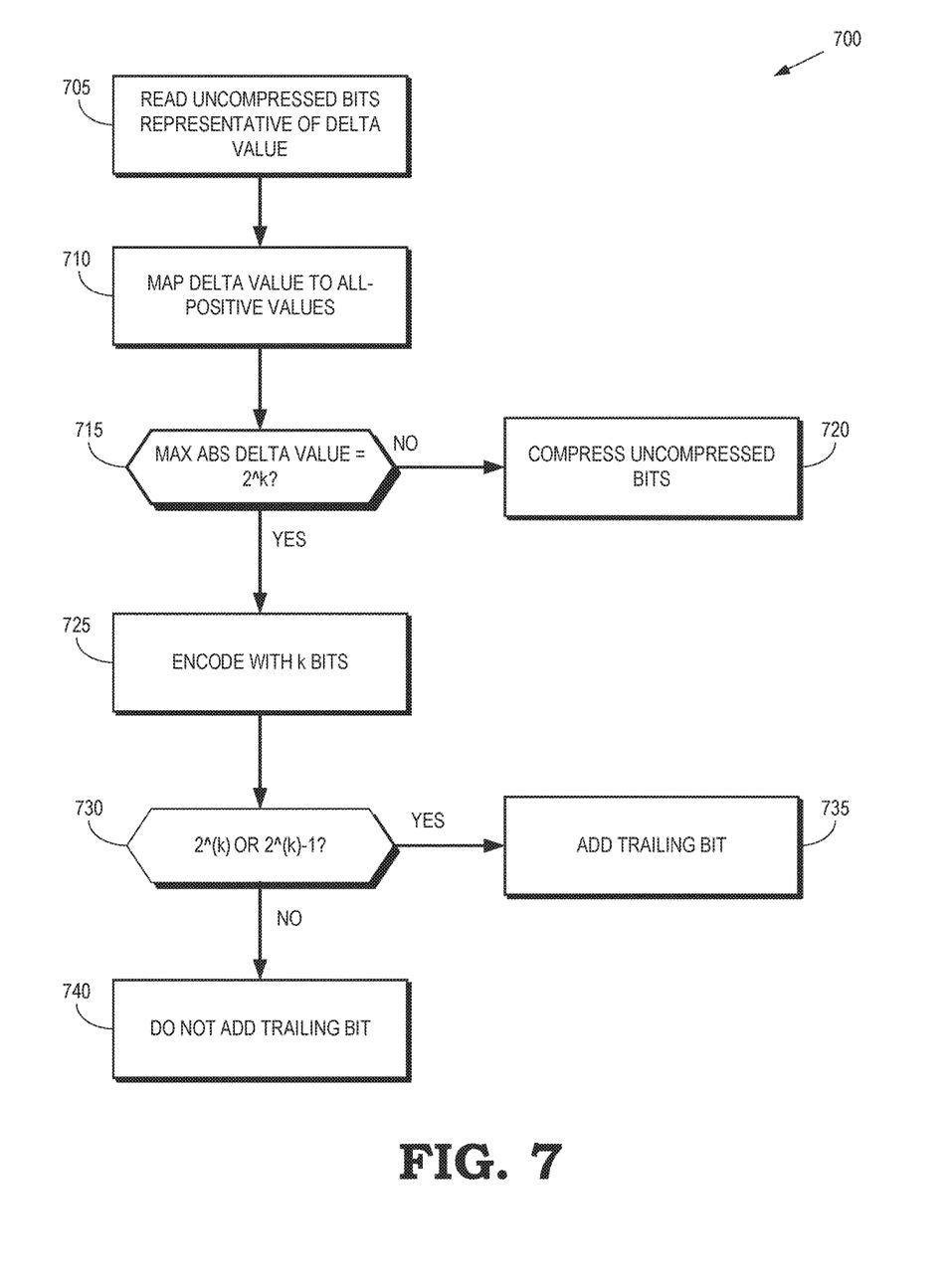
FIG. 7 is a flow diagram of a method for encoding delta values in a group that has a maximum delta value equal to a power-of-two according to some embodiments.

FIG. 7 is a flow diagram of a method 700 for encoding delta values in a group that has a maximum delta value equal to a power-of-two according to some embodiments. The method 700 is implemented in some embodiments of the compressor 205 shown in FIG. 2.

At block 705, the compressor reads uncompressed bits representative of the delta values. At block 710, the compressor maps the delta values to all-positive values, as discussed herein. The compressor adds one additional bit to indicate that the sign optimization is being used and one or more additional bits to indicate the sign of the delta value if the delta values are all-negative or if the delta values are a mix of positive and negative values. For example, the compressor can determine values of the additional bits according to some embodiments of the method 600 shown in FIG. 6.

At decision block 715, the compressor determines whether a maximum absolute delta value for a pixel in the group is equal to a power-of-two (e.g., $2^k$ for k>0). In that case, k+1 bits are required to represent the delta values in the group because the group has been mapped to all-positive values in block 710. If the maximum absolute delta value for pixel in the group is not equal to a power of two, the compressor compresses the uncompressed bits at block 720, e.g., according to some embodiments of the method 300 shown in FIG. 3. If the maximum absolute delta value for a pixel in the group is equal to a power of two, the compressor encodes each delta value using k bits (instead of using k+1 bits) at block 725.

By encoding the delta values using k bits, delta values that are equal to $2^k$ or $2^k$–1 would be represented by the same k-bit number. To resolve the degeneracy, at decision block 730, the compressor determines if the delta value is equal to $2^k$ or $2^k$–1. If so, the compressor adds (at block 735) a trailing bit and sets the value of the trailing bit to indicate whether the corresponding delta value is equal to $2^k$–1 or 2k. If the delta value is not equal to $2^k$ or $2^k$–1, the compressor bypasses (at block 740) adding the trailing bit.

The example compression algorithm illustrated in FIG. 7 uses a trailing bit to distinguish between two degenerate encoded values of the delta values. However, in some variations, a smaller number of bits can be used to perform the basic encoding (e.g., less than k bits can be used to encode delta values ranging up to a maximum absolute delta value of 2k for k>0. Additional trailing bits are then used to resolve the resulting degeneracies. For example, if the delta values in a block are 0, 1, 2, 3, 4, and 5, the maximum absolute delta value is 5 which is $2^2$+1 or k=2. Three bits are therefore needed to represent each delta value because the maximum absolute delta value is greater than $2^2$=4. A total of 6*3=18 bits is therefore needed to represent all delta values. However, if the maximum absolute delta value evaluated in block 715 is equal to $2^n$+1, then the delta values equal to $2^n$–1, $2^n$, and $2^n$+1 are all encoded as the degenerate value of $2^n$–1. Additional trailing bits are added to the delta values to distinguish between the degenerate values of $2^n-1$, $2^n$, and $2^n+1$. For example, a trailing bit of "1" is added to $2^n-1$, two trailing bits of "01" are added to $2^n$, and two trailing bits "00" are added to $2^n+1$. The input data stream 0, 1, 2, 3, 4, and 5 is then compressed to a series of binary values: 00, 01, 10, 111, 1101, and 1111 and 1100. The total number of bits in the compressed binary stream is 2+2+2+3+4+4=17, which is a savings of one bit in this example.

Some embodiments of the compressor add a bit to the block header to indicate whether the power-of-two optimization is being used for the corresponding block. For example, this bit can be set (or reset) to indicate that the power-of-two optimization is not being used if the compressor determines that the number of bits is not reduced. Although adding an additional bit reduces the compression rate for the algorithm, in some variations the decompressor needs fewer processing cycles to decompress the bitstream if the additional bit is present to indicate whether the power-of-two optimization is being used, which can reduce the number of clock cycles required by the decompressor.

Figure 8:
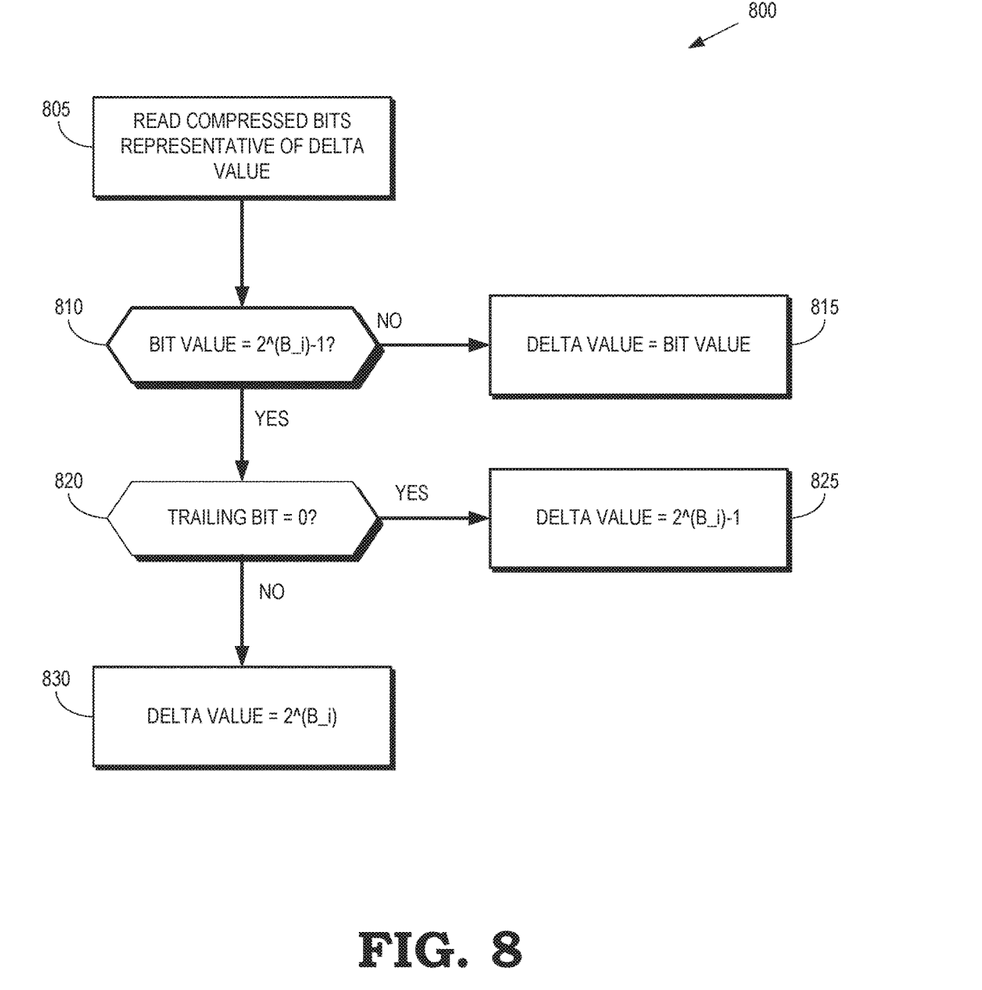
FIG. 8 is a flow diagram of a method for decoding delta values in a group that has a maximum delta value equal to a power-of-two according to some embodiments.

FIG. 8 is a flow diagram of a method 800 for decoding delta values in a group that has a maximum delta value equal to a power-of-two according to some embodiments. The method 800 is implemented in some embodiments of the decompressor 210 shown in FIG. 2. The decompressor uses the method 800 to decompress bitstreams that are compressed according to a corresponding compression algorithm, such as the compression algorithm illustrated in the method 700 of FIG. 7.

At block 805, the decompressor reads bits that are representative of a delta value for a pixel in a group of a block. The decompressor has previously determined the value of the quantity $B_i$ using information included in the block header and the corresponding group header. Delta values in the group are encoded using $B_i$ bits.

At decision block 810, the decompressor determines whether the bit value indicated by the bits representative of the delta value is equal to a maximum encoded bit value of $2^{(B_i)}-1$. If not, the decompressor sets the delta value equal to the bit value at block 715. If the decompressor determines that the bit value indicated by the bits representative of the delta value is equal to $2^{(B)}-1$, the method 800 flows to decision block 820.

At decision block 820, the decompressor reads in a trailing bit and determines whether the trailing bit is equal to 0 or 1. If the trailing bit is equal to 0, the decompressor determines that the delta value is equal to $2^{(B_i)}-1$ at block 725. If the trailing bit is equal to 1, the decompressor determines that the delta value is equal to $2^{(B_i)}$ at block 830. The association of the trailing bits to the delta values is arbitrary and the opposite convention may also be used in some embodiments.

Figure 9:
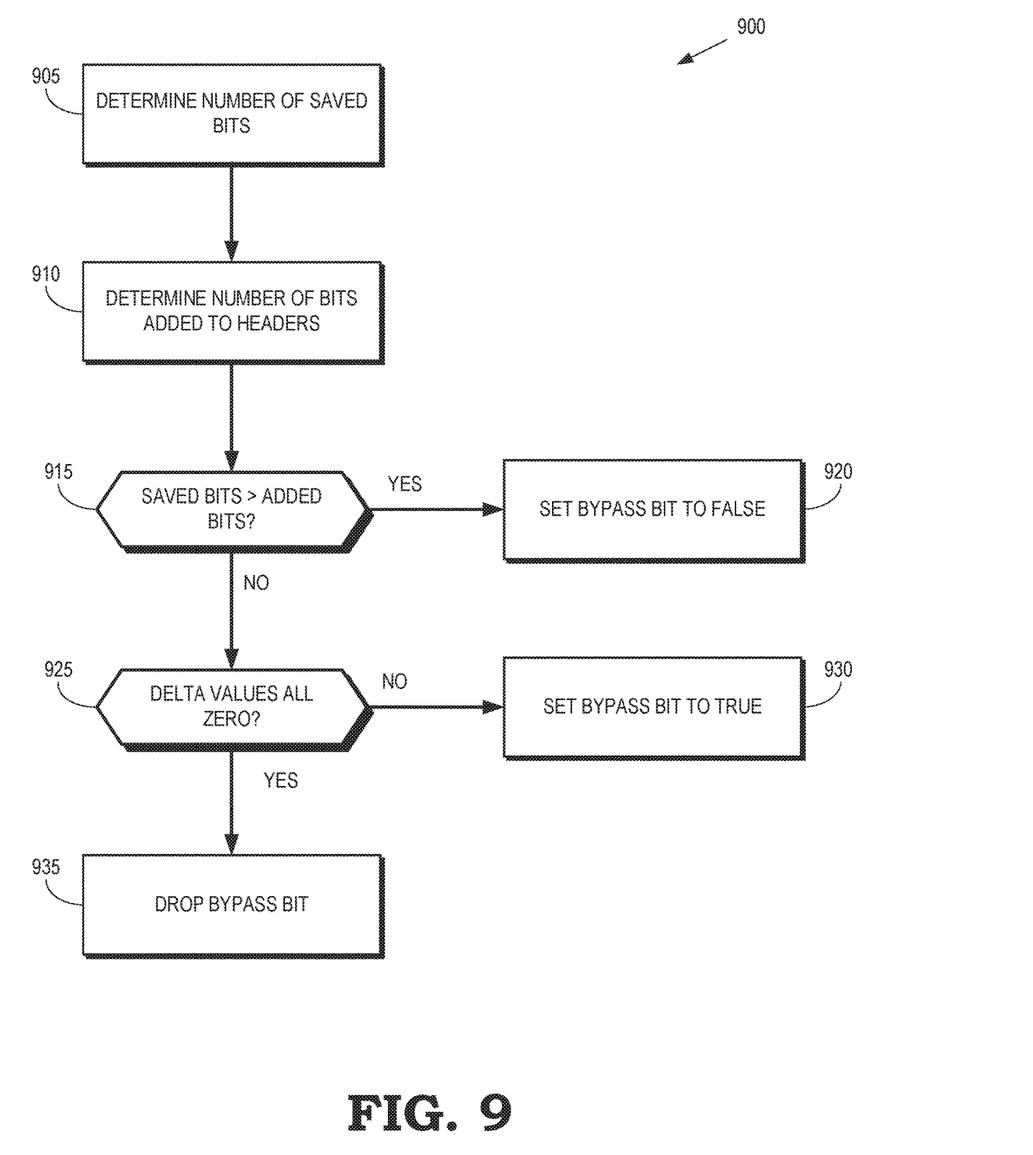
FIG. 9 is a flow diagram of a method of determining whether to bypass features of a compression algorithm according to some embodiments.

FIG. 9 is a flow diagram of a method 900 of determining whether to bypass features of a compression algorithm according to some embodiments. The method 900 is implemented in some embodiments of the compressor 205 shown in FIG. 2. A corresponding decompression process is implemented in some embodiments of the decompressor 210 shown in FIG. 2 to decode the compressed bitstream that is generated according to the method 900.

At block 905, the compressor determines a number of bits that are saved by encoding delta values for the pixels in a block according to one or more optimizations of the compression algorithm implemented by the compressor. For example, the compressor can determine a first number of bits that are sufficient to encode the delta values according to some embodiments of the method 300 shown in FIG. 3. The compressor can also determine a second number of bits that are sufficient to encode the delta values when additional optimization features are implemented, such as features implemented according to some embodiments of the method 600 shown in FIG. 6, the method 700 shown in FIG. 7, or the method 800 shown in FIG. 8. The number of saved bits is equal to the difference between the first number and the second number.

At block 910, the compressor determines a number of bits that are added to the block header or the group headers to support compression of the encoded delta values according to the one or more optimizations. For example, the compressor can determine a first number of bits that are needed to represent the values in the block header and the group headers to support encoding the delta values according to some embodiments of the method 300 shown in FIG. 3. The compressor can also determine a second number of bits that are needed to represent the values in the block header and the group headers to support encoding the delta values when additional optimization features are implemented, such as features implemented according to some embodiments of the method 600 shown in FIG. 6, the method 700 shown in FIG. 7, or the method 800 shown in FIG. 8. The number of added bits is equal to the difference between the first number and the second number.

At decision block 915, the compressor determines whether the number of saved bits is greater than the number of added bits. If so, the compressor sets (at block 920) a bypass bit in the block header to FALSE (or some other value) to indicate that the compressor is using the additional features to compress the encoded delta values. If the number of saved bits is less than the number of added bits, the method 900 flows to decision block 925.

At decision block 925, the compressor determines whether all of the delta values for the pixels in the block are equal to zero. If not, the compressor sets (at block 930) the bypass bit in the block header to TRUE (or some other value) to indicate that the compressor is bypassing the use of the additional features to compress the encoded delta values. If all the delta values for the pixels in a block are equal to zero, the bypass bit may be dropped from the block header at block 935 to further reduce the bit count.

In some embodiments, the apparatus and techniques described above are implemented in a system comprising one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM)) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining delta values for a plurality of pixels in a block, wherein each delta value represents a difference between a color of one of the plurality of pixels and a reference color of a reference pixel selected from the plurality of pixels;
   subdividing the plurality of pixels into a plurality of groups, wherein different minimum numbers of bits are used to represent the delta values in the plurality of groups;
   generating a compressed bitstream representative of the delta values, wherein the compressed bitstream includes:
   bits representative of a block header that indicates a range of the minimum numbers of bits that are used to represent the delta values in the plurality of groups;
   a plurality of group headers, each group header indicating a group minimum number of bits that is used to represent the delta values in a corresponding one of the plurality of groups; and
   the delta values encoded using the group minimum number of bits for the group that includes the delta values; and
   transmitting the compressed bitstream.

2. The method of claim 1, wherein determining the delta values for the plurality of pixels in the block comprises determining each of the delta values using a predetermined number of bits to represent a color difference and a sign of the delta value, and wherein a total number of bits in the compressed bitstream is less than a sum, over the plurality of pixels, of the predetermined number of bits used to represent the delta values for the plurality of pixels.

3. The method of claim 1, wherein the block header includes bits that indicate a minimum number of bits (M) to represent the delta values in any one of the groups and a first number of bits (B) that are used to represent a difference between M and a second number of bits to represent a largest value of the number of bits that are used to represent the delta values, and wherein the plurality of group headers each include bits that indicate a difference between M and a group minimum number of bits that represent the delta values in a corresponding one of the plurality of groups.

4. The method of claim 3, wherein the bits representative of the block header include a third number of bits used to represent all possible combinations of M and B, and further comprising: encoding a combination of values of M and B to form an encoded value represented by the third number of bits, and wherein the block header comprises the encoded value.

5. The method of claim 1, wherein subdividing the plurality of pixels in the block into the plurality of groups comprises:
   subdividing the plurality of pixels into the plurality of groups according to different group configurations;
   comparing a total number of bits in the compressed bitstreams that are generated using the different group configurations; and
   selecting one of the different group configurations for subdividing the plurality of groups based on the comparison.

6. The method of claim 1, further comprising:
determining whether the delta values in each of the groups are all-positive, all-negative, or mixed positive and negative values;
in response to determining the delta values within a group are all-positive or all-negative, omitting bits indicating signs of the delta values from the group header for that group; and
in response to determining the delta values within a group are mixed positive and negative values, including, in the group header for that group, bits to indicate the delta values within the group are mixed positive and negative values.

7. The method of claim 6, further comprising:
including a bypass bit in the block header to indicate whether the group headers include bits indicating whether the delta values in the corresponding group are all-positive, all-negative, or mixed positive and negative values; and
bypassing inclusion of the bypass bit in the block header in response to determining that all the delta values associated with the plurality of pixels in the block are equal to zero.

8. The method of claim 6, further comprising:
in response to determining that a maximum absolute delta value for pixels in a group is equal to a power-of-two, encoding the delta values in the group using one bit less than the group minimum number of bits so that delta values having the maximum absolute value or one less than the maximum absolute value are represented by a maximum encoded bit value; and
adding a trailing bit to the maximum encoded bit value to indicate whether the maximum encoded bit value indicates the maximum absolute value or one less than the maximum absolute value.

9. A method comprising:
receiving a compressed bitstream representative of delta values of a plurality of pixels in a block, wherein the pixels are subdivided into a plurality of groups, wherein different minimum numbers of bits are used to represent the delta values in the plurality of groups, wherein the compressed bitstream includes bits representative of a block header that indicates a range of the minimum numbers of bits that are used to represent the delta values in the plurality of groups, a plurality of group headers that each indicate a group minimum number of bits that is used to represent the delta values in a corresponding one of the plurality of groups, and wherein the delta values have been encoded using the group minimum number of bits for the group that includes the delta values; and
decompressing the compressed bitstream based on the block header, the plurality of group headers, and the encoded delta values to recover the delta values that each represent a difference between a color of one of the plurality of pixels and a reference color of a reference pixel selected from the plurality of pixels.

10. The method of claim 9, wherein decompressing the compressed bitstream comprises recovering the delta values that are represented by a predetermined number of bits that indicate a color difference and a sign of the delta value, and wherein a total number of bits in the compressed bitstream is less than a sum, over the plurality of pixels, of the predetermined number of bits used to represent the delta values for the plurality of pixels.

11. The method of claim 9, wherein the block header includes bits that indicate a minimum number of bits (M) that are used to represent the delta values in any one of the groups and a first number of bits (B) that is are used to represent a difference between M and a second number of bits that are used to represent a largest value of the number of bits that are used to represent the delta values, and wherein the plurality of group headers each include bits that indicate a difference between M and a group minimum number of bits that are used to represent the delta values in a corresponding one of the plurality of groups.

12. The method of claim 11, wherein the bits representative of the block header include a third number of bits used to represent all possible combinations of M and B, and further comprising:
decoding an encoded value of a combination of values of M and B that is represented by the third number of bits, and wherein the block header comprises the encoded value.

13. The method of claim 9, further comprising:
determining whether the delta values in each of the groups are all-positive, all-negative, or mixed positive and negative values based on bits included in the corresponding group headers;
in response to determining the delta values within a group are all-positive or all-negative, omitting bits indicating signs of the delta values from the group header for that group; and
in response to determining the delta values within a group are mixed positive and negative values, including, in the group header for that group, bits to indicate the delta values within the group are mixed positive and negative values.

14. The method of claim 13, further comprising:
detecting a bypass bit in the block header when at least a portion of the delta values associated with the plurality of pixels in the block are not equal to zero, wherein the bypass bit indicates whether the group headers include bits indicating whether the delta values in the corresponding group are all-positive, all-negative, or mixed positive and negative values; and
decoding the group headers based on a value of the bypass bit.

15. The method of claim 13, further comprising:
determining that a maximum absolute value of the delta values for pixels in a group is equal to a power-of-two;
decoding delta values in the group using one bit less than the group minimum number of bits; and
decoding delta values represented by a maximum encoded bit value based on the maximum encoded bit value and a trailing bit that indicates whether the maximum encoded bit value indicates the maximum absolute value or one less than the maximum absolute value.

16. An apparatus comprising:
a compute unit configured to generate a bitstream representative of a plurality of pixels in a block; and
a compressor configured to:
determine delta values for the plurality of pixels, wherein each delta value represents a difference between a color of one of the plurality of pixels and a reference color of a reference pixel selected from the plurality of pixels;
subdivide the plurality of pixels in the block into a plurality of groups, wherein different minimum numbers of bits are used to represent the delta values in the plurality of groups;
generate a compressed bitstream representative of the delta values, wherein the compressed bitstream includes:

bits representative of a block header that indicates a range of the minimum numbers of bits that are used to represent the delta values in the plurality of groups, a plurality of group headers that each indicate a group minimum number of bits that is used to represent the delta values in a corresponding one of the plurality of groups, and wherein the delta values have been encoded using the group minimum number of bits for the group that includes the delta values; and transmit the compressed bitstream.

17. The apparatus of claim 16, wherein the block header includes bits that indicate a minimum number of bits (M) that are used to represent the delta values in any one of the groups and a first number of bits (B) that are used to represent a difference between M and a second number of bits that are used to represent a largest value of the number of bits that are used to represent the delta values, and wherein the plurality of group headers each include bits that indicate a difference between M and a group minimum number of bits that are used to represent the delta values in a corresponding one of the plurality of groups.

18. The apparatus of claim 17, wherein the bits representative of the block header include a third number of bits used to represent all possible combinations of M and B, and wherein the compressor is configured to encode a combination of values of M and B to form an encoded value represented by the third number of bits, and wherein the block header comprises the encoded value.

19. The apparatus of claim 16, wherein the compressor is configured to:

determine whether the delta values in each of the groups are all-positive, all-negative, or mixed positive and negative values;

drop bits indicating signs of the delta values in groups that are all-positive or all-negative; and include bits in the group headers to indicate whether the delta values in the corresponding group are all-positive, all-negative, or mixed positive and negative values.

20. The apparatus of claim 19, wherein, in response to determining that a maximum absolute value of the delta values for pixels in a group is equal to a power-of-two, the compressor is configured to:

encode the delta values in the group using one bit less than the group minimum number of bits so that delta values having the maximum absolute value or one less than the maximum absolute value are represented by a maximum encoded bit value; and add a trailing bit to the maximum encoded bit value to indicate whether the maximum encoded bit value indicates the maximum absolute value or one less than the maximum absolute value.

21. An apparatus comprising:

a compressor configured to generate a compressed bitstream representative of delta values of a plurality of pixels in a block, wherein the pixels are subdivided into a plurality of groups, and wherein different minimum numbers of bits are used to represent the delta values in the plurality of groups; and a decompressor configured to:

receive the compressed bitstream including bits representative of a block header that indicates a range of numbers of bits that are sufficient to represent the delta values, a plurality of group headers that each indicate a group minimum number of bits that are used to represent the delta values in a corresponding one of the plurality of groups, and wherein the delta values have been encoded using the group minimum number of bits for the group that includes the delta values; and decompress the compressed bitstream based on the block header, the plurality of group headers, and the encoded delta values to recover the delta values that each represent a difference between a color of one of the plurality of pixels and a reference color of a reference pixel selected from the plurality of pixels.

22. The apparatus of claim 21, wherein the block header includes bits that indicate a minimum number of bits (M) that are used to represent the delta values in any one of the groups and a first number of bits (B) that are used to represent a difference between M and a second number of bits that are used to represent a largest value of the number of bits that are used to represent the delta values, and wherein the plurality of group headers each include bits that indicate a difference between M and a group minimum number of bits that are used to represent the delta values in a corresponding one of the plurality of groups.

23. The apparatus of claim 22, wherein the bits representative of the block header include a third number of bits used to represent all possible combinations of M and B, and wherein the decompressor is configured to: decode an encoded value of a combination of values of M and B that is represented by the third number of bits, and wherein the block header comprises the encoded value.

24. The apparatus of claim 21, wherein the decompressor is configured to:

determine whether the delta values in each of the groups are all-positive, all-negative, or mixed positive and negative values based on bits included in the corresponding group headers;

in response to determining the delta values within a group are all-positive or all-negative, omit bits indicating signs of the delta values from the group header for that group; and in response to determining the delta values within a group are mixed positive and negative values, include, in the group header for that group, bits to indicate the delta values within the group are mixed positive and negative values.

25. The apparatus of claim 24, wherein the decompressor is configured to:

detect a bypass bit in the block header when at least a portion of the delta values associated with the plurality of pixels in the block are not equal to zero, wherein the bypass bit indicates whether the group headers include bits indicating whether the delta values in the corresponding group are all-positive, all-negative, or mixed positive and negative values; and decode the group headers based on a value of the bypass bit.

26. The apparatus of claim 24, wherein the decompressor is configured to:

determine that a maximum absolute value of the delta values for pixels in a group is equal to a power-of-two; and decode delta values in the group using one bit less than the group minimum.

* * * * *